United States Patent
Bergeron et al.

(10) Patent No.: US 10,122,636 B2
(45) Date of Patent: Nov. 6, 2018

(54) PROCESSING DATA UNITS

(71) Applicant: Keysight Technologies Singapore (Holdings) Pte Ltd., Minneapolis, MN (US)

(72) Inventors: Matthew R. Bergeron, Thousand Oaks, CA (US); Bryan Rittmeyer, Sherman Oaks, CA (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 77 days.

(21) Appl. No.: 14/327,974

(22) Filed: Jul. 10, 2014

(65) Prior Publication Data

US 2016/0014004 A1  Jan. 14, 2016

(51) Int. Cl.
   G06F 15/173  (2006.01)
   H04L 12/801  (2013.01)
   H04L 12/861  (2013.01)
   H04L 12/26   (2006.01)

(52) U.S. Cl.
   CPC ........ H04L 47/196 (2013.01); H04L 49/9057 (2013.01); H04L 43/50 (2013.01)

(58) Field of Classification Search
   CPC ............... H04L 47/196; H04L 43/0888; H04L 43/0894
   USPC ........................................................ 709/224
   See application file for complete search history.

(56) References Cited

U.S. PATENT DOCUMENTS

| 6,920,125 | B1 * | 7/2005 | Wu ....................... H04W 92/12 370/338 |
| 7,873,065 | B1 * | 1/2011 | Mukerji ................ H04L 47/365 370/353 |
| 2002/0196787 | A1 * | 12/2002 | Rajan .................. H04L 49/3009 370/393 |
| 2003/0147411 | A1 * | 8/2003 | Goosman ............... H04L 69/22 370/412 |
| 2004/0032825 | A1 * | 2/2004 | Halford ............... H04L 27/0008 370/208 |
| 2006/0056442 | A1 * | 3/2006 | DaCosta ........... H04W 72/1263 370/458 |

(Continued)

OTHER PUBLICATIONS

"Large segment offload," http://en.wikipedia.org/wiki/Large_segment_offload, pp. 1-2 (Jan. 15, 2014).

(Continued)

*Primary Examiner* — Nicholas Taylor
*Assistant Examiner* — Meng Vang

(57) ABSTRACT

Methods, systems, and computer readable media for processing data units are disclosed. According to one method, the method occurs at a network interface of a computing platform having per data unit processing overhead that limits throughput of the network interface. The method includes concatenating multiple individual data units into a concatenated data unit (CDU), wherein the CDU includes a header portion for at least one of the multiple data units, processing the CDU as a single data unit rather than as multiple individual data units such that the CDU incurs processing overhead of a single data unit rather than that of multiple individual data units, and de-concatenating the CDU into the multiple individual data units.

21 Claims, 6 Drawing Sheets

(56) References Cited

U.S. PATENT DOCUMENTS

| | | | |
|---|---|---|---|
| 2010/0214978 A1* | 8/2010 | Chen | H04L 69/04 370/328 |
| 2011/0051669 A1* | 3/2011 | Wang | H04L 1/1829 370/328 |
| 2012/0300778 A1* | 11/2012 | Tamura | H04L 12/66 370/392 |

OTHER PUBLICATIONS

"Large receive offload," http://en.wikipedia.org/wiki/Large_receive_offload, pp. 1-2 (Apr. 24, 2013).

* cited by examiner

PROCESSING DATA UNITS

TECHNICAL FIELD

The subject matter described herein relates to processing information. More specifically, the subject matter relates to methods, systems, and computer readable media for processing data units.

BACKGROUND

Conventional networking equipment has limits (e.g., hardware related limits) associated with data throughput, e.g., a number of data units (e.g., frames or packets) that can be handled per second. Sometimes users, e.g., network operators, may want to exceed these limits. For example, throughput limits can be easily reached when attempting to generate or process a large amount of traffic for high speed and/or high bandwidth networks. Hence, when using equipment or systems in high speed and/or high bandwidth networks, numerous resources (e.g., multiple servers and/or routers) may be needed to provide or process a suitable amount of traffic, which can be expensive.

Some techniques exist to decrease processing overhead associated with a large amount of packets, such as large segment offload (LSO) and large receive offload (LRO). However, such techniques are inefficient and/or incapable of offloading packets or data units in various network scenarios. For example, these techniques generally discard information in the offloaded packets that can be difficult or even impossible to recreate in various network scenarios. Moreover, these techniques are generally tied to a single protocol or only offload packets associated with the same session.

Accordingly, in light of these difficulties, a need exists for improved methods, systems, and computer readable media for processing data units.

SUMMARY

Methods, systems, and computer readable media for processing data units are disclosed. According to one method, the method occurs at a network interface of a computing platform having per data unit processing overhead that limits throughput of the network interface. The method includes concatenating multiple individual data units into a concatenated data unit (CDU), wherein the CDU includes a header portion for at least one of the multiple data units, processing the CDU as a single data unit rather than as multiple individual data units such that the CDU incurs processing overhead of a single data unit rather than that of multiple individual data units, and de-concatenating the CDU into the multiple individual data units.

According to one system, the system includes a network interface of a computing platform having per data unit processing overhead that limits throughput of the network interface. The network interface includes a memory. The network interface is configured to concatenate multiple individual data units into a concatenated data unit (CDU), wherein the CDU includes a header portion for at least one of the multiple data units, to process the CDU as a single data unit rather than as multiple individual data units such that the CDU incurs processing overhead of a single data unit rather than that of multiple individual data units, and to de-concatenate the CDU into the multiple individual data units.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for processing data units. In accordance with some aspects of the subject matter described herein, a computing platform (e.g., a testing platform, a device, or a node) or a module (e.g., a field-programmable gateway array (FPGA), an application-specific integrated circuit (ASIC), or software executing on a processor) may be configured to process one or more data units, such as a frame, a packet, a datagram, a user datagram protocol (UDP) packet, a transport control protocol (TCP) packet, or, more generally, a protocol data unit (PDU). For example, a computing platform or module in accordance with aspects of the present disclosure may be configured to pack or concatenate multiple data units into one or more concatenated data units (CDUs). In this example, the computing platform or module may perform certain processing functions associated with the one or more CDUs and may unpack or de-concatenate CDUs such that a receiving entity receives the original or un-concatenated data units. By concatenating data units into a CDU and performing certain processing functions, the computing platform may overcome throughput or related limitations associated with processing data because the processing overhead is minimized since the multiple data units are processed or handled as a single data unit for these purposes.

In accordance with some aspects of the subject matter described herein, a computing platform or module may be configured to concatenate data units that are associated with different sessions, data flows, and/or protocols. For example, in contrast to conventional packet offloading solutions that aggregate packets of a single protocol or which offload only packets associated with the same session, a CDU in accordance with aspects of the present disclosure may include data units associated with multiple different sessions (e.g., 100 TCP connections) and/or different protocols, such as UDP and TCP packets.

In accordance with some aspects of the subject matter described herein, a computing platform or module may be configured to concatenate data units without modifying header portions associated with the data units. For example, in contrast to conventional packet offloading solutions which may discard header portions for offloaded packets, a CDU in accordance with aspects of the present disclosure may include original data units, e.g., data units with unmodified or original header portions.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
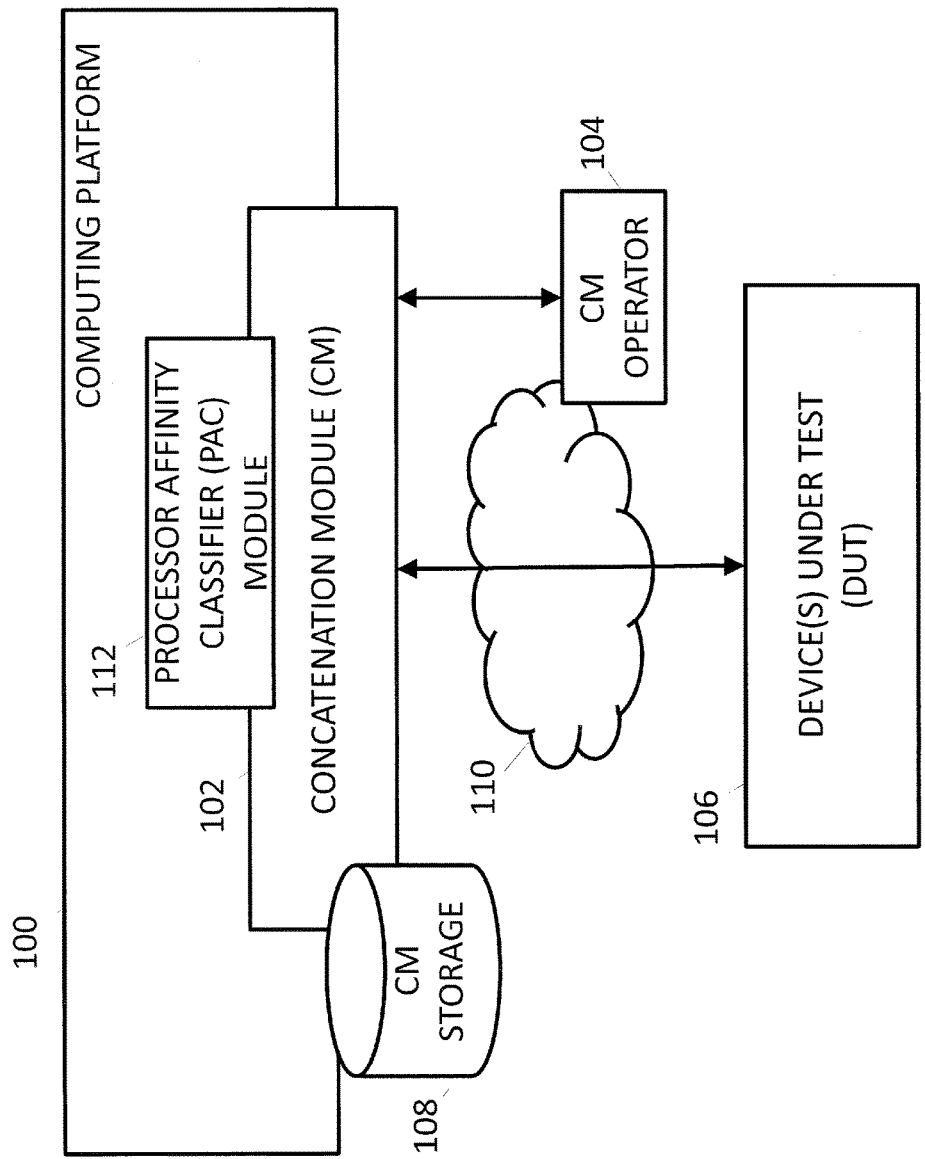
FIG. 1 is a diagram illustrating an exemplary computing platform for processing data units according to an embodiment of the subject matter described herein.

FIG. 1 is a diagram illustrating an exemplary computing platform 100 for processing data units according to an embodiment of the subject matter described herein. Computing platform 100 may represent any suitable entity or entities (e.g., one or more testing platforms, nodes, or devices) associated with sending or receiving traffic (e.g., one or more data units). For example, computing platform 100 may generate a substantial amount of traffic for testing one or more device(s) under test (DUT) 106. In this example, computing platform 100 may receive traffic from DUT 106 and analyze one or more performance aspects associated with DUT 106.

In some embodiments, computing platform 100 may be a stand-alone tool, a testing device, or software executing on a processor. In some embodiments, computing platform 100 may be a single node or may be distributed across multiple computing platforms or nodes.

In some embodiments, computing platform 100 may include one or more modules for performing various functions. For example, computing platform 100 may include a packet generation module for generating traffic for testing DUT 106 and/or a network node emulation module for emulating a node or device that communicates with DUT 106.

Computing platform 100 may include a processor affinity classifier (PAC) module 112. PAC module 112 may be any suitable entity for classifying or sorting data units. In some embodiments, PAC module 112 may be sort or classify data units that are being received by or transmitted from computing platform 100. For example, PAC module 112 may classify or sort data units for processing in a multiple processor or multi-core environment. In some embodiments, PAC module 112 may be associated with a concatenation module (CM) 102 or related functionality.

Computing platform 100 may include CM 102. CM 102 may be any suitable entity or entities (e.g., software executing on a processor, an ASIC, an FPGA, or a combination of software, an ASIC, or an FPGA) for performing one or more aspects associated with processing (e.g., receiving, generating, sorting, concatenating, de-concatenating, and/or sending) data units. For example, CM 102 may include or be associated with one or more network interface cards (NICs) or related network interface(s) therein for receiving or sending numerous data units (e.g., frames or packets). In this example, CM 102 may concatenate received data units into one or more CDU(s) and may process (e.g., perform error detection and/or inspect one or more timestamps) the CDU(s) before de-concatenating the CDU(s) into the original data units for further processing, e.g., by applications or software associated with computing platform 100. In another example, a NIC associated with computing platform 100 may send numerous data units (e.g., frames or packets). In this example, prior to sending the data units, CM 102 may concatenate the data units into one or more CDU(s) and may process the CDU(s) before de-concatenating the CDU(s) into the original data units and sending the data units to DUT 106. In yet another example, CM 102, or functionality therein, may be distributed across multiple computing platforms or nodes. In this example, computing platform 100 may include CM 102 for concatenating data units into a CDU and DUT 106 may include CM 102 for de-concatenating the CDU. In this example, either CM 102 may perform some processing of the CDU, e.g., at computing platform 100 and/or at DUT 106.

In some embodiments, CM 102 may include functionality for concatenating data units in a single processor environment or a multiple processor (e.g., multi-core) environment. For example, in a multi-core environment, data units may be sorted or classified by PAC module 112 for processing by a particular processor using a processor affinity value, a hash value, and/or other factors. In this example, after sorting data units based on a processor affinity value related to sessions, data units associated with sessions 1-5 may be sorted for processing by one processor and data units associated with sessions 6-10 may be sorted for processing by another processor. After sorting or classifying by PAC 112, CM 102 (e.g., at each processor) may receive or obtain relevant data units and may use the data units to generate one or more CDUs.

In some embodiments, CM 102 may include functionality for concatenating data units associated with multiple different flows, sessions, and/or protocols into a CDU. For example, CM 102 may generate a CDU containing a first TCP packet associated with a first session and a second TCP packet associated with a second session. In another example, CM 102 may generate a CDU containing a TCP packet and a UDP packet, where each packet is associated with a different origination or destination. In yet another example, CM 102 may generate a CDU containing one or more Ethernet frames and/or one or more TCP packets.

In some embodiments, CM 102 may include functionality for concatenating data units without discarding or modifying header portions associated with the data units. For example, CM 102 may generate a CDU containing a first TCP packet and a second TCP packet, where both header portions and payload portions of the packets are stored in the CDU. In another example, CM 102 may generate a CDU containing multiple Ethernet frames, where both header portions and payload portions of the Ethernet frames are stored in the CDU. In contrast, conventional offloading processing techniques generally discard header portions of individual packets and attempt to recreate the headers based on a single packet or session. Hence, such conventional offloading processing techniques are ill-suited to handle concatenation associated with numerous sessions or multiples users since these techniques cannot accurately recreate headers for such diverse packets.

In some embodiments, in a multi-core environment, each processor can process packets independently of other processors by sorting or classifying data units with regard to processor since statistics or related information for flows (e.g., one or more related packets) can be gathered as packets are processed. In contrast, in an "unclassified" multi-core environment, locks and synchronization logic may be needed such that statistical information can be gathered for each data flow. That is, in an "unclassified" multi-core environment, each processor may handle one or more data units for a given flow and, as such, each processor must be able to share statistics regarding the flow with other processors and/or shared data storage (e.g., CM storage 108). By requiring each processor to communicate with other processors and/or to synchronize data writes or reads, significantly more resources or logic may be needed as compared to a "classified" multi-core environment. Additional information regarding sorting and/or classifying data units for multiple processors is discussed below in relation to FIG. 4.

In some embodiments, CM 102 may include functionality for determining how many data units to include in CDUs, e.g., when performing concatenation. For example, CM 102 may use concatenation related information in a CDU and/or information in CM storage 108 to determine how many data units to include in a CDU and/or how long to wait for that particular number of data units to arrive before generating a CDU with or without that specified number. Exemplary concatenation related information for generating CDUs may include time out values, programmable counters (e.g., a data unit counter), historical data (e.g., previous user configurations), preconfigured data (e.g., software logic), or dynamic data (e.g., current network conditions).

In some embodiments, CM 102 may generate and/or store concatenation related information and/or other information in a CDU (e.g., a decode key) and/or CM storage 108. Exemplary concatenation related information may include de-concatenation or decode information, also referred to herein as a decode key, usable for de-concatenating a CDU into multiple data units, information for indicating how many data units are concatenated, information for indicating what types of data units are concatenated, information for authentication or error detection, and/or information for indicating long to wait before concatenating or de-concatenating data units. For example, CM 102 may generate one or more timestamps associated with the CDU or data units therein and include this information in the CDU. In another example, CM 102 may generate a cyclic redundancy check (CRC), a checksum value, a signature, an error detection code, or an authentication related code and may include this information in the CDU or CM storage 108.

In some embodiments, CM 102 may include functionality for processing CDUs and/or data units stored therein. Exemplary processing may include compressing and/or encrypting a CDU or data units therein, performing authentication and/or error detection associated with a CDU or data units therein, inspecting one or more timestamps associated with a CDU or data units therein, and/or generating one or more timestamps associated with a CDU or data units therein. For example, CM 102 may generate a CDU containing multiple TCP and UDP packets and may compress the CDU using one or more compression techniques. In another example, CM 102 may compress multiple TCP and UDP packets prior to concatenating the packets into a CDU. In yet another example, CM 102 may compress multiple TCP and UDP packets, concatenate the packets into a CDU, and then further compress the CDU. Some exemplary compression techniques may include header compression (e.g., robust header compression (ROHC)), payload compression (e.g., IP payload compression protocol (IPComp)), and/or other methods. In embodiments where compression is used, throughput may be significantly increased. For example, if a compression ratio used is four to 1 (4:1), a 10 gigabits per second link may be able to transmit a 40 gigabits per second link's data.

In some embodiments, CM 102 may include functionality for performing authentication and/or error detection associated with CDUs and/or data units therein. For example, CM 102 (e.g., software, an ASIC, and/or an FPGA) may generate, compute, and/or inspect an error detection related code (e.g., a checksum or CRC) based on one or more data units associated with a CDU. In this example, an error detection code may be inspected to indicate with whether one or more data units in the CDU are corrupt or likely to contain errors. In another example, CM 102 may generate, compute, and/or inspect a timestamp based on one or more data units associated with a CDU. For example, a timestamp associated with a CDU may be the earliest timestamp of all timestamps associated with data units that comprise the CDU. In this example, if a subsequent CDU includes a timestamp that is less than a timestamp associated with a preceding CDU, CM 102 may determine that data units are arriving out of order.

In some embodiments, CM 102 may include functionality for de-concatenating CDUs into one or more data units. For example, CM 102 may de-concatenate a CDU using a decode key stored in the CDU or CM storage 108. In this example, the decode key may include offset information and/or size information usable for identifying data units in the CDU.

In some embodiments, CM 102 may include functionality for determining boundaries of CDUs, e.g., when performing de-concatenation.

For example, CM 102 may use concatenation related information in a CDU and/or information in CM storage 108 to determine the "end" of a CDU such that de-concatenation is performed correctly. Exemplary concatenation related information for boundaries of CDUs may include time out values, programmable counters, historical data, preconfigured data, or dynamic data, and/or information in CDUs.

In some embodiments, CM 102 may include one or more communications interfaces (e.g., one or more NICs) for interacting with users and/or nodes. For example, CM 102 may use one or more communications interfaces for receiving and sending various types of data units; such as IP packets, Ethernet frames, Ethernet packets, PDUs, datagrams, UDP packets, TCP packets, IP version 4 (v4) packets, IP version 6 (v6) packets, stream control transmission protocol (SCTP) packets, real-time transport protocol (RTP) packets, or reliable data protocol (RDP) packets, packets using a tunneling protocol, and/or other data units.

In some embodiments, CM 102 may provide a communications interface for communicating with CM user 104. CM user 104 may be any entity (e.g., an automated system or a device or system controlled or controllable by a human user) for selecting and/or configuring various aspects associated with concatenating data units. For example, various user interfaces (e.g., an application user interface (API) and a graphical user interface (GUI)) may be provided for implementing concatenation and/or de-concatenation techniques and for providing related configuration information, such as time out periods for concatenation and status information to be stored in each CDU. Exemplary user interfaces for testing DUT 106 and/or for implementing concatenation and de-concatenation techniques may support automation (e.g., via one or more scripting languages), a representation state transfer (REST) API, a command line, and/or a web based GUI.

In some embodiments, CM 102 may include one or more communications interfaces for interacting with DUT 106. DUT 106 may be any suitable entity or entities (e.g., devices, systems, or platforms) communicating with computing platform 100 and/or receiving, processing, or sending one or more data units. For example, DUT 106 may include a router, a network switch, a server, or a network controller. In another example, DUT 106 may include one or more systems and/or computing platforms, e.g., a data center or a group of servers and/or routers. In yet another example, DUT 106 may include one or more networks or related components, e.g., an access network, a core network, or the Internet.

In some embodiments, DUT 106 may be unaware of any concatenation being performed at CM 102 or computing platform 100. For example, DUT 106 may receive data units that do not include concatenation related data. In some embodiments, DUT 106 may be aware of concatenation being performed at CM 102 or computing platform 100 and/or may be capable of processing CDUs or related data. For example, in scenarios where CDUs are sent to DUT 106, DUT 106 may include CM 102 or other functionality for de-concatenating received CDUs into individual data units.

In some embodiments, CM 102 may include functionality for accessing CM storage 108. CM storage 108 may be any suitable entity or entities (e.g., a storage device, a non-transitory computer readable medium, or a storage system) for maintaining or storing information related to processing data units. For example, CM storage 108 may contain concatenation related information usable for implementing or performing concatenation and/or de-concatenation techniques. Exemplary concatenation related information may include information about handling various protocols, data units, or sessions, information for determining how many packets are to be included in each CDU (e.g., time out values, a maximum size for a CDU, a maximum number of data units, or other factors to be considered), information for determining what is included in a CDU, information for processing (e.g., encrypting or compressing) a CDU, information for determining which data units are processed by a given processor (e.g., processor affinity factors and/or hash functions) and/or other concatenation related information. In some embodiments, CM storage 108 may be located at computing platform 100, another node, or distributed across multiple platforms or devices.

Network 110 may be any suitable entity or entities for facilitating communications between various nodes and/or modules, e.g., in a test or live environment. For example, network 110 may include an access network, a mobile network, the Internet, or another network for communicating with DUT 106, CM user 104, CM 102, and/or computing platform 100. In some embodiments, DUT 106, CM user 104, CM 102, and/or computing platform 100 may be located in or associated with network 110 or another location.

It will be appreciated that FIG. 1 is for illustrative purposes and that various nodes and/or modules, locations, and/or functionality described above in relation to FIG. 1 may be changed, altered, added, or removed.

Figure 2A:
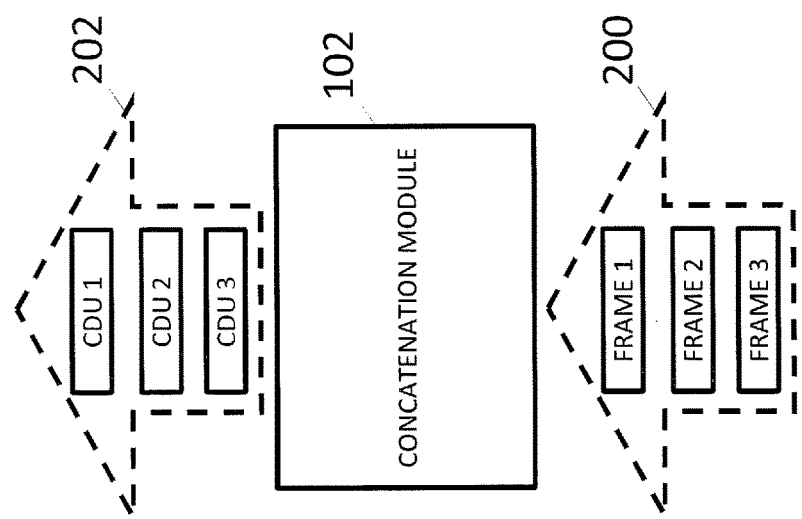
FIGS. 2A and 2B are diagrams illustrating an exemplary concatenation module (CM) processing data units according to an embodiment of the subject matter described herein.
Figure 2B:
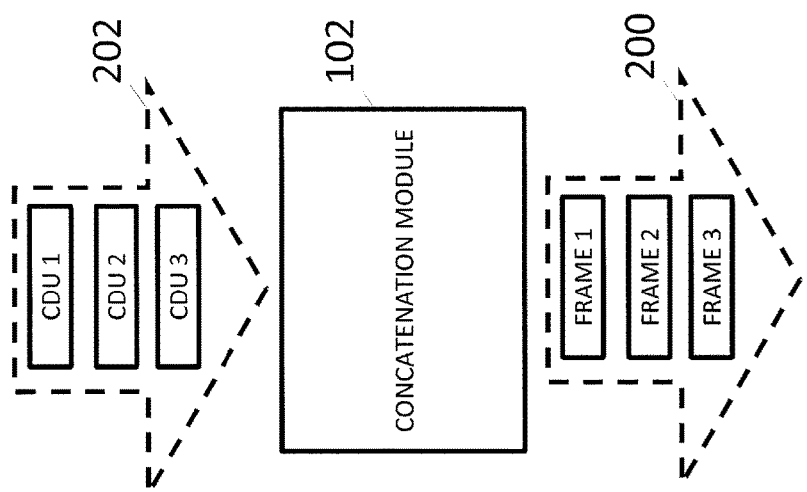

FIGS. 2A and 2B are diagrams illustrating exemplary CM 102 processing data units according to an embodiment of the subject matter described herein. In some embodiments, CM 102 may be configured to receive one or more data units, to concatenate the data units or portion therein into a CDU, to process the CDU, and to de-concatenate the data units into the original or related data units. In some embodiments, CM 102 or another entity (e.g., software associated with a communication stack or NIC) may further process the data units, e.g., by decapsulating a frame into one or more packets or by encapsulating one or more packets into frames.

In some embodiments, CM 102 may include functionality for processing related to various open systems interconnection (OSI) model layers (e.g., layers 1-7). For example, CM 102 may include functionality for performing some OSI layer 2 (e.g., data link layer) processing. In this example, CM 102 may include functionality for providing a reliable link between two directly connected nodes, including functionality for detecting and possibly correcting errors that may occur in the physical layer. CM 102 may also include functionality for encapsulating frames 200 into CDUs 202 and/or decapsulating CDUs 202 into frames 200. In another example, CM 102 may include functionality for performing some OSI layer 3 (e.g., network layer) processing, such as packaging data into data units or un-packaging data from data units.

In some embodiments, CM 102 may process one or more CDUs 202 and/or frames 200 to obtain, gather, extract, generate, and/or retrieve data. For example, as shown in FIG. 2B, CM 102 may decapsulate CDUs 202 to obtain frames 200. In this example, frames 200 or data therein may be sent to other software, devices, and/or components for further processing.

Referring to FIG. 2A, CM 102 may be configured to receive one or more frames 200, e.g., transmitted by DUT 106 or another entity to computing platform 100. Frames 200 may include Ethernet frames, where each Ethernet frame may include a header portion, a payload portion, and/or a CRC or other information usable for detecting data corruption. Each header portion may include various parameters, such as an origination address and destination address. Each payload portion may include one or more data units, such as an Ethernet packet, an IP packet, a TCP packet, and/or a UDP packet.

After receiving one or more frames 200, CM 102 may generate a CDU (e.g., CDU 1 of CDUs 202) using the one or more frames 200 and/or data therein. In some embodiments, CM 102 may generate a CDU by concatenating one or more frames 200 such that the one or more frames 200 are unmodified (e.g., header portions are not discarded, truncated, or merged). In such embodiments, a CDU may be generated by encapsulating frames 200 into another frame and by adding additional information (e.g., a decode key) usable for processing and/or de-concatenating the CDU after processing.

In some embodiments, CM 102 may generate a CDU by concatenating at least some data associated with one or more frames 200. For example, header portions and/or data portions associated with some frames 200 may be modified, discarded, compressed, truncated, or merged. In such embodiments, a CDU may be generated by encapsulating only payload portions from those frames 200 into a packet or frame and adding additional information usable for processing and/or de-concatenating the CDU after processing.

In some embodiments, after generating a CDU, CM 102 may be configured to perform some processing associated with the CDU. In some embodiments, the concatenation and processing may be performed to speed up throughput limits associated with computing platform 100 or devices therein. For example, CM 102 may perform header related processing (e.g., error detection) associated with CDU and/or data therein. In this example, other processing associated with data units in the CDU may be performed by software, hardware, or other entities (e.g., in a higher OSI layer) that are not concerned with or limited by throughput or other physical (e.g., hardware-based) limitations.

Referring to FIG. 2B, CM 102 may be configured to receive one or more CDUs 202, e.g., received from or generated by a portion of CM 102 or another entity. CDUs 202 may each include one or more frames 200 and/or data therein. For example, a CDU may include multiple frames 200, related data units, and a decode key for de-concatenating the CDU into individual frames 200 or data units.

In some embodiments, after receiving a CDU, CM 102 may be configured to perform some processing associated with the CDU. In some embodiments, the processing may be performed to speed up throughput limits associated with computing platform 100 or devices therein. For example, CM 102 may perform header related processing (e.g., error detection) associated with CDU and/or data therein. In this example, other processing associated with data units in the CDU may be performed by software, hardware, or other entities (e.g., in a higher OSI layer) that are not concerned with or limited by throughput or other physical (e.g., hardware-based) limitations.

In some embodiments, CM 102 may de-concatenate a CDU into one or more frames 200. For example, CM 102 may use a decode key containing offset information to identify where each of frames 200 are stored in a CDU and may de-concatenate, reconstruct, and/or retrieve frames 200. In another example, CM 102 may use a decode key containing size information to identify where each of frames 200 are stored in a CDU and may de-concatenate, reconstruct, and/or retrieve frames 200. In some embodiments, CM 102 may de-concatenate a CDU into one or more frames 200 or other data units and the one or more frames 200 or other data units may be further processed by other entities, e.g., a software and/or hardware implementation of a protocol stack.

In some embodiments, after de-concatenating a CDU into one or more frames 200, CM 102 may be configured to perform some processing associated with the one or more frames 200. In some embodiments, the de-concatenation and/or processing of one or more frames 200 may be performed to speed up throughput limits associated with computing platform 100 or devices therein.

It will be appreciated that FIGS. 2A and 2B are for illustrative purposes and that CM 102 may include functionality for processing different and/or additional data units than CDUs 202 and frames 200 depicted in FIGS. 2A-2B.

Figure 3:
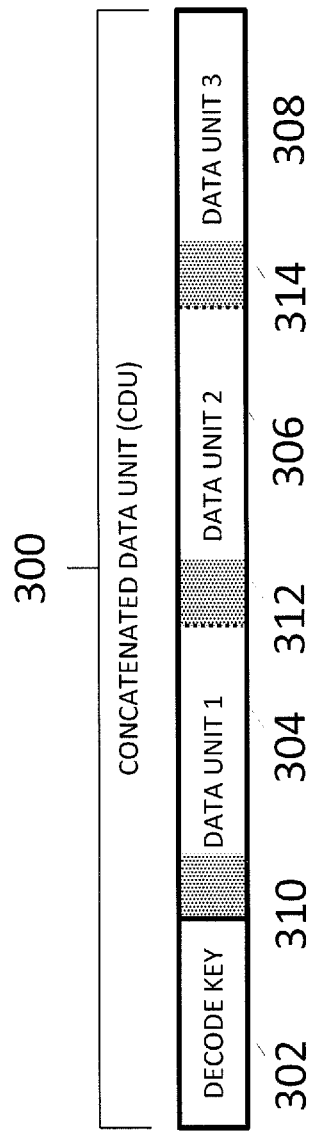
FIG. 3 is a diagram illustrating an exemplary concatenated data unit (CDU) according to an embodiment of the subject matter described herein.

FIG. 3 is a diagram illustrating an exemplary CDU 300 according to an embodiment of the subject matter described herein. In some embodiments, CDU 300 may include data associated with one or more data units. For example, CDU 300 may include a "super" packet containing numerous packets or other data units in its payload portion. In another example, CDU 300 may include a "super" frame containing numerous frames or other data units in its payload portion.

Referring to FIG. 3, CDU 300 may include control information (e.g., header information) usable for processing CDU 300 and user information or payload information. As depicted in FIG. 3, CDU 300 may include a decode key 302 and data units 304, 306, and 308. Data units 304, 306, and 308 may include header portions 310, 312, and 314, respectively.

Decode key 302 may represent any suitable information for de-concatenating or decoding CDU 300 or data therein. In some embodiments, decode key 302 may be stored in a header portion and/or a payload portion of a CDU. In some embodiments, decode key 302 may include offset information indicating locations (e.g., first bits or bytes) of data units, similar to a chain or linked list data structure. In some embodiments, decode key 302 may include size information indicating size or length of data units in the CDU, similar to a table data structure.

In some embodiments, decode key 302 may be located in a header portion of the CDU and/or may be stored in CM storage 108. For example, in embodiments where decode key 302 is not in CDU 300, decode key 302 or related information may be stored in CM storage 108 and may be accessible using information (e.g., a unique identifier) stored in the CDU.

Each of data units 304, 306, and 308 may represent a frame, a packet, a datagram, a UDP packet, a TCP packet, a PDU, or other data unit. In some embodiments, one or more of data units 304, 306, and 308 may be stored in a payload portion of CDU 300. For example, each of data units 304, 306, and 308 including associated header portions (e.g., header portions 310, 312, and 314) may be located in a payload portion of CDU 300.

In some embodiments, CDU 300 and/or data therein (e.g., decode key 302 and data units 304, 306, and 308) may be compressed or encrypted using various techniques and/or methods. For example, one exemplary compression technique may involve storing identical data of data units 304, 306, and 308 in CDU 300 and storing differences between data units 304, 306, and 308 in CDU 300. In this example, redundant data associated with data units 304, 306, and 308 may be omitted or removed when compressing CDU 300 using this compression technique.

It will be appreciated that CDU 300 in FIG. 3 is for illustrative purposes and that different and/or additional information may be included in CDU 300.

Figure 4:
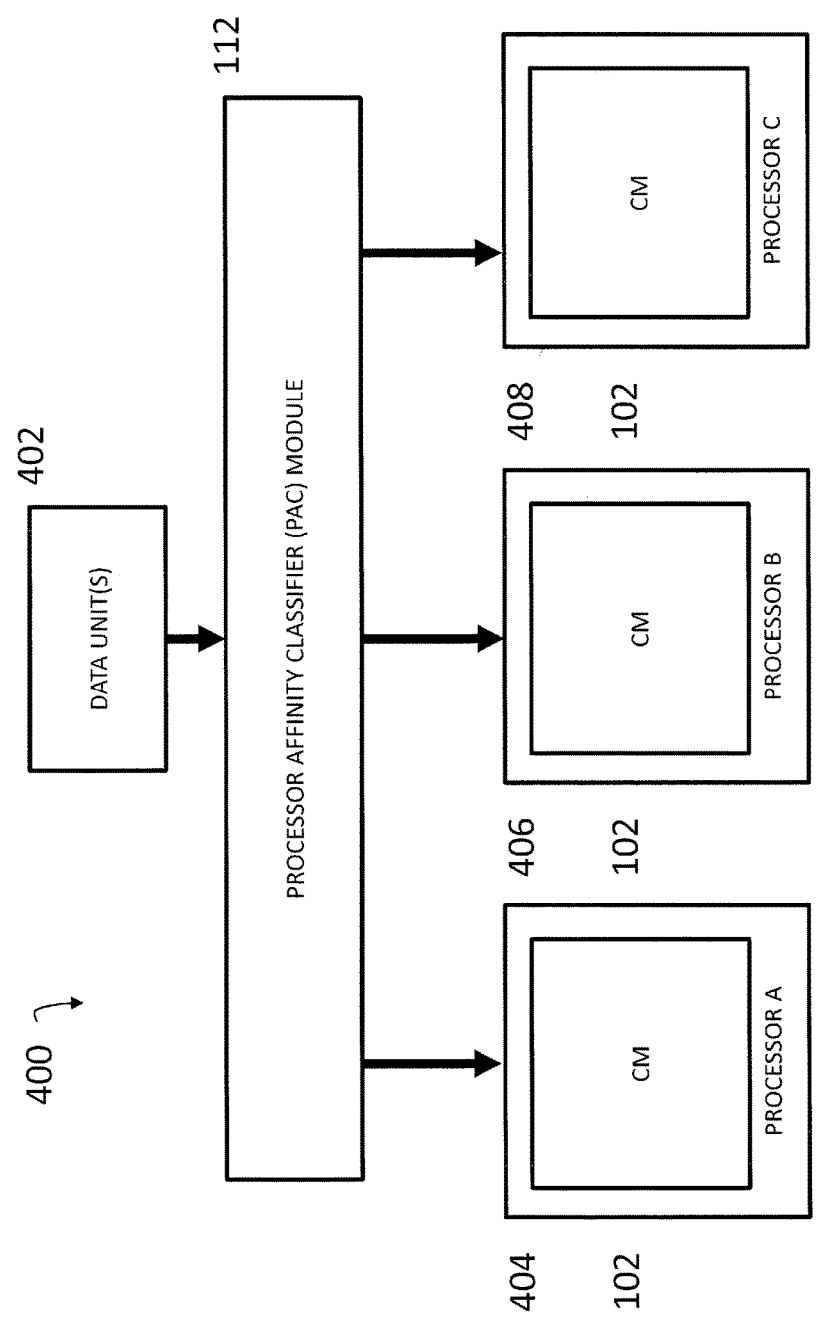
FIG. 4 is a diagram illustrating an exemplary processor affinity classifier (PAC) module according to an embodiment of the subject matter described herein.

FIG. 4 is a diagram illustrating PAC module 112 in a multi-core environment 400 according to an embodiment of the subject matter described herein. Referring to FIG. 4, PAC module 112 may receive or obtain data units 402, e.g., from one or more buffers associated with a packet generation module in computing platform 100 or received by a NIC at computing platform 100. Data units 402 may represent various packets, frames, and/or other data portions. In some embodiments, data units 402 may be associated with multiple sessions or data flows. In such embodiments, PAC module 112 may be configured to sort data units 402 such that data units 402 for a given session or flow is handled by only one of processors 404, 406, and 408.

In some embodiments, PAC module 112 may use processor affinity values (e.g., hash values that indicate a particular processor for processing) to sort or classify data units 402. For example, a hash value for each data unit may be computed using a hash function and some parameter values (e.g., an origination address, a destination address, and a protocol type) associated with the data unit. In this example, data units associated with a hash value within a first specified range (e.g., 1-10) may be sorted or classifying as having an affinity for processor 404, data units associated with a hash value within a second specified range (e.g., 11-20) may be sorted or classifying as having an affinity for processor 406, and data units associated with a hash value within a third specified range (e.g., 21-30) may be sorted or classifying as having an affinity for processor 408. In this example, hash values may be closely linked with session or data flow identifiers, e.g., data units associated with the same flow may be associated with the same hash value).

In some embodiments, PAC module 112 may use network conditions and/or other factors to sort or classify data units 402. For example, PAC module 112 may sort or classify data units 402 of a certain type (e.g., UDP packets) for processing by processor 404, whereas other data units 402 may be sorted or classified for processing by processors 406 and 408. In another example, PAC module 112 may determine that processor 406 is overloaded and, as such, may only sort or classify small or "simple" data units for processing by processor 406, whereas other data units 402 (e.g., encrypted or encapsulated data units 402 that require more processing resources) may be sorted or classified for processing by processors 404 and/or 408.

Processors 404, 406, and 408 may represent any suitable entities (e.g., a digital microprocessor, an analog processor, an FPGA, an ASIC, or combinations thereof) for processing data units. Processors 404, 406, and 408 may include CMs 102 or related functionality. For example, each CM 102 may receive data units associated with particular sessions or data flows and may concatenate the data units into one or more CDUs 202. In this example, each CM 102 may process CDUs 202 and/or data therein before de-concatenating CDUs 202.

Figure 5:
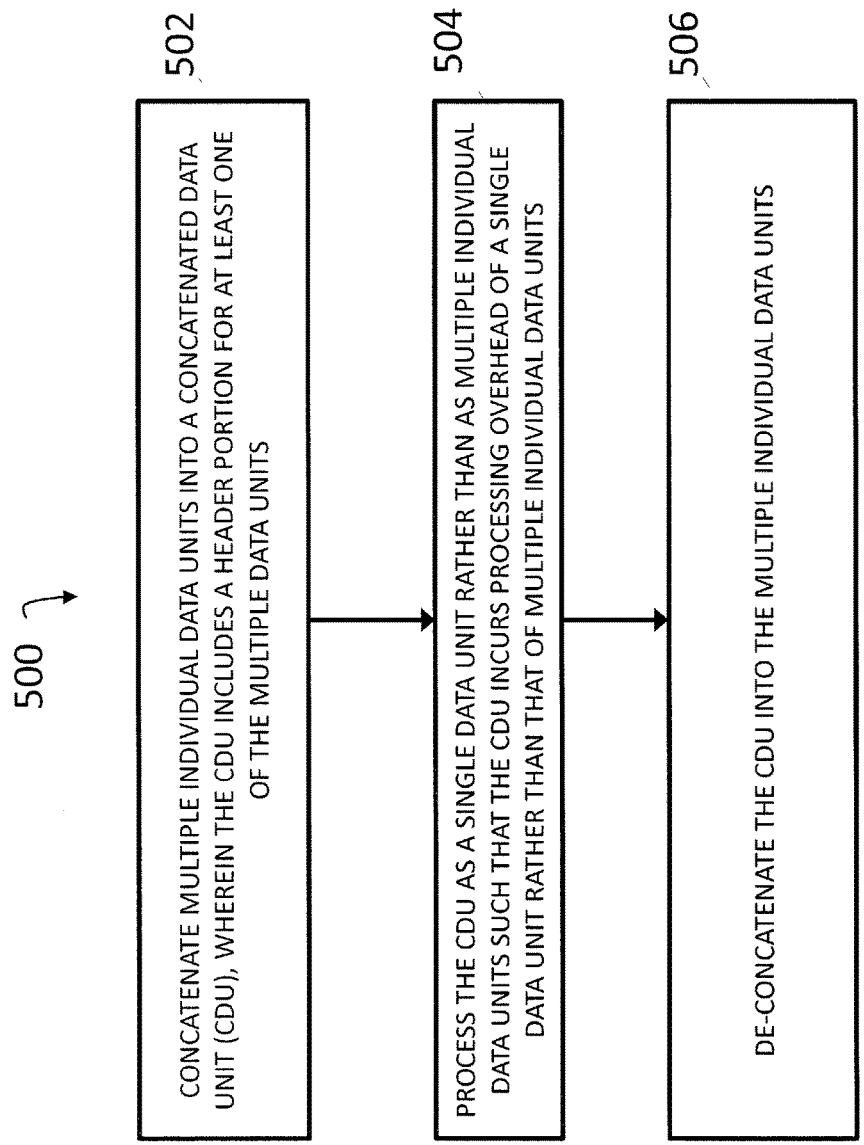
FIG. 5 is a diagram illustrating an exemplary process for processing data units according to an embodiment of the subject matter described herein.

FIG. 5 is a diagram illustrating an exemplary process for processing data units according to an embodiment of the subject matter described herein. In some embodiments, exemplary process 500, or portions thereof, may be performed by or at computing platform 100, CM 102, PAC 112, a network interface, and/or another node or module. For example, computing platform 100 may include a network equipment test device and/or a testing platform for testing one or more performance aspects associated with DUT 106. In another example, computing platform 100 and/or CM 102 may be configured to process live or real (e.g., non-test) data units, e.g., in a live (e.g., non-test) network.

In some embodiments, exemplary process 500, or portions thereof, may occur between a physical layer and a data link layer. In some embodiments, exemplary process 500, or portions thereof, may occur during, before, or after physical layer processing or a data link layer processing.

At step 502, multiple individual data units may be concatenated into a CDU, where the CDU may include a header portion for at least one of the multiple individual data units. For example, data unit 304, data unit 306, and data unit 308 may be concatenated in CDU 300. In this example, each data unit includes a header portion, e.g., header portion 310, header portion 312, and header portion 314.

In some embodiments, data units 402 may include a frame, a packet, a datagram, a UDP packet, a TCP packet, or a PDU. For example, data units 402 may be received from or sent to DUT 106.

In some embodiments, a CDU may include a first data unit associated with a first flow and a second data unit associated with a second flow, the second flow may be different from the first flow.

In some embodiments, a CDU may include a first data unit associated with a first flow and a second data unit associated with the first flow.

In some embodiments, the CDU or data therein (e.g., or one or more individual data units) may be compressed and/or encrypted.

In some embodiments, concatenating multiple data units into a CDU may include generating and storing a decode data portion (e.g., decode key 302) in the CDU for de-concatenating the CDU.

In some embodiments, concatenating multiple data units into a CDU may include sorting or classifying the multiple data units using processor affinity values. For example, PAC module 112 may determine a processor affinity value for various data units such that the same processor handles data units associated with the same session or data flow.

In some embodiments, concatenating multiple data units into a CDU may include determining, using a time out period, a counter, preconfigured information, dynamic information, or information in one or more of the multiple data units, how many data units to include in the CDU.

In some embodiments, a decode data portion may include offset information indicating locations of each of multiple data units in a CDU and/or may include size information associated with each of multiple data units in the CDU.

In some embodiments, a CDU may include protocol data units associated with different protocols.

At step 504, the CDU may be processed as a single data unit rather than as multiple individual data units such that the CDU incurs processing overhead of a single data unit rather than that of multiple individual data units. For example, CDU 300 or data therein may be copied, moved, or transferred from CM 102 or a network interface therein, e.g., to a processor or another entity associated with computing platform 100. In another example, CDU 300 or data therein may be inspected for status information or concatenation related information, such as CRCs, checksums, and/or timestamps. In this example, the status information may be inspected for determining whether one or more data units are corrupted and/or need to be resent.

In some embodiments, processing a CDU may include transferring, moving, or copying the CDU from a network interface.

At step 506, the CDU may be de-concatenated into the multiple individual data units. For example, CDU 300 may be de-concatenated into data unit 304, data unit 306, and data unit 308.

In some embodiments, steps 502, 504, and 506 are performed to overcome throughput limits associated with the network interface or related components.

In some embodiments, a CDU may be de-concatenated into multiple data units using a decode data portion (e.g., decode key 302) associated with the CDU.

While the above description includes examples of processing data units associated with DUT 106, it will be appreciated that aspects of the present subject matter may be usable for processing data units in various situations, e.g., any situation in which throughput limitations may be avoided or overcomed by using one or more concatenation and/or de-concatenation techniques described herein.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:
1. A method for processing data units, the method comprising: at a computing platform comprising a network equipment test device, wherein the network equipment test device comprises a plurality of processors for performing data unit concatenation, wherein the computing platform has throughput limitations associated with processing data:

sorting or classifying individual data units using processor affinity values, wherein each of the processor affinity values identifies to which processor of the plurality of processors an individual data unit should be forwarded to for concatenation with other individual data units associated with the same processor affinity value;

concatenating, using a first processor of the plurality of processors associated with a first processor affinity value, multiple individual data units into a concatenated data unit (CDU), wherein the CDU includes a header portion for at least one of the multiple data units, wherein the multiple individual data units in the CDU are associated with the first processor affinity value;

processing the CDU as a single data unit rather than as multiple individual data units such that the CDU incurs processing overhead of a single data unit rather than that of multiple individual data units; and de-concatenating the CDU into the multiple individual data units, wherein the concatenating, processing, and de-concatenation occur in a network interface of the network equipment test device.

2. The method of claim 1 wherein the CDU includes a first data unit associated with a first flow and a second data unit associated with a second flow, the second flow being different from the first flow.

3. The method of claim 1 wherein the CDU includes a first data unit associated with a first flow and a second data unit associated with the first flow.

4. The method of claim 1 comprising compressing or encrypting the CDU or one or more of the individual data units.

5. The method of claim 1 wherein concatenating the multiple individual data units into the CDU includes generating and storing a decode data portion in the CDU for de-concatenating the CDU.

6. The method of claim 5 wherein the decode data portion includes offset information indicating locations of each of the multiple individual data units in the CDU or includes size information associated with each of the multiple individual data units in the CDU.

7. The method of claim 1 wherein concatenating the multiple data units into the CDU includes determining, using a time out period, a counter, preconfigured information, dynamic information, or information in one or more of the multiple individual data units, how many data units to include in the CDU.

8. The method of claim 1 wherein processing the CDU includes transferring, moving, or copying the CDU from the network interface.

9. The method of claim 1 wherein the multiple data units are received from or sent to a device under test.

10. The method of claim 1 wherein the concatenating, processing, and de-concatenation occur between a physical layer and a data link layer.

11. A system for processing data units, the system comprising: a computing platform having throughput limitations associated with processing data, the computing platform comprising a network equipment test device, wherein the network equipment test device comprises:

a plurality of processors for performing data unit concatenation; and a memory, wherein the computing platform is configured to sort or classify individual data units using processor affinity values, wherein each of the processor affinity values identifies to which processor of the plurality of processors an individual data unit should be forwarded to for concatenation with other individual data units associated with the same processor affinity value; to concatenate, using a first processor of the plurality of processors associated with a first processor affinity value, multiple individual data units into a concatenated data unit (CDU), wherein the CDU includes a header portion for at least one of the multiple data units, wherein the multiple individual data units in the CDU are associated with the first processor affinity value, to process the CDU as a single data unit rather than as multiple individual data units such that the CDU incurs processing overhead of a single data unit rather than that of multiple individual data units, and to de-concatenate the CDU into the multiple individual data units, wherein the concatenating, processing, and de-concatenation occur in a network interface of the network equipment test device.

12. The system of claim 11 wherein the CDU includes a first data unit associated with a first flow and a second data unit associated with a second flow, the second flow being different from the first flow.

13. The system of claim 11 wherein the CDU includes a first data unit associated with a first flow and a second data unit associated with the first flow.

14. The system of claim 11 wherein the computing platform is configured to compress or encrypt the CDU or one or more of the individual data units.

15. The system of claim 11 wherein the computing platform is configured to generate and store a decode data portion in the CDU for de-concatenating the CDU.

16. The system of claim 15 wherein the decode data portion includes offset information indicating locations of each of the multiple individual data units in the CDU or includes size information associated with each of the multiple individual data units in the CDU.

17. The system of claim 11 wherein the computing platform is configured to determine, using a time out period, a counter, preconfigured information, dynamic information, or information in one or more of the multiple individual data units, how many data units to include in the CDU.

18. The system of claim 11 wherein the computing platform is configured to transfer, move, or copy the CDU from the network interface.

19. The system of claim 11 wherein the multiple data units are received from or sent to a device under test.

20. The system of claim 11 wherein the computing platform is configured to concatenate, process, and de-concatenate between a physical layer processing and a data link layer.

21. A non-transitory computer readable medium comprising computer executable instructions embodied in the non-transitory computer readable medium that when executed by a processor of a computer perform steps comprising: at a computing platform comprising a network equipment test device, wherein the network equipment test device comprises a plurality of processors for performing data unit concatenation, wherein the computing platform has throughput limitations associated with processing data:

sorting or classifying individual data units using processor affinity values, wherein each of the processor affinity values identifies to which processor of the plurality of processors an individual data unit should be forwarded to for concatenation with other individual data units associated with the same processor affinity value;

concatenating, using a first processor of the plurality of processors associated with a first processor affinity value, multiple individual data units into a concatenated data unit (CDU), wherein the CDU includes a header portion for at least one of the multiple data units, wherein the multiple individual data units in the CDU are associated with the first processor affinity value;

processing the CDU as a single data unit rather than as multiple individual data units such that the CDU incurs processing overhead of a single data unit rather than that of multiple individual data units; and de-concatenating the CDU into the multiple individual data units, wherein the concatenating, processing, and de-concatenation occur in a network interface of the network equipment test device.

* * * * *